(12) United States Patent
Jia et al.

(10) Patent No.: US 8,793,263 B2
(45) Date of Patent: Jul. 29, 2014

(54) AVOIDING DUPLICATE AND EQUIVALENT DATA OBJECTS IN SERVICE REGISTRIES

(75) Inventors: Bin Jia, Eastleigh (GB); James Robert Magowan, Woking (GB)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/182,339

(22) Filed: Jul. 13, 2011

(65) Prior Publication Data

US 2012/0047155 A1 Feb. 23, 2012

(30) Foreign Application Priority Data

Aug. 23, 2010 (EP) .................................... 10173741

(51) Int. Cl.
*G06F 17/30* (2006.01)
(52) U.S. Cl.
CPC ............................. *G06F 17/30309* (2013.01)
USPC ........... 707/756; 707/760; 707/776; 707/796; 707/802
(58) Field of Classification Search
CPC ..................... G06F 17/30309; G06F 17/30569
USPC ............. 707/1, 100, 104, 756, 736, 760, 776, 707/796, 802, 808, 809, 810
See application file for complete search history.

(56) References Cited

U.S. PATENT DOCUMENTS

| 7,149,730 | B2 * | 12/2006 | Mullins et al. ......... 707/999.002 |
| 7,293,010 | B2 * | 11/2007 | Angele et al. .......... 707/999.001 |
| 7,296,028 | B1 * | 11/2007 | Ivanova .................... 707/999.1 |
| 7,584,210 | B2 * | 9/2009 | Wight et al. ................. 705/26.1 |
| 7,865,820 | B2 | 1/2011 | Sauer et al. |
| 7,882,122 | B2 * | 2/2011 | Wong ............................ 707/760 |
| 7,912,932 | B2 | 3/2011 | Barnes-Leon et al. |
| 7,962,512 | B1 | 6/2011 | Sholtis et al. |
| 7,987,163 | B2 * | 7/2011 | Keshavarz-Nia et al. ..... 707/694 |
| 7,996,434 | B2 * | 8/2011 | Palanisamy et al. .......... 707/796 |
| 8,069,435 | B1 * | 11/2011 | Lai ................................. 717/106 |
| 8,122,006 | B2 | 2/2012 | de Castro Alves et al. |
| 8,219,522 | B2 * | 7/2012 | Johnston et al. .............. 707/609 |
| 2005/0234873 | A1 | 10/2005 | Milligan et al. |
| 2007/0214065 | A1 | 9/2007 | Kahlon et al. |
| 2009/0006302 | A1 | 1/2009 | Fan et al. |
| 2009/0204612 | A1 | 8/2009 | Keshavarz-Nia et al. |
| 2009/0216801 | A1 | 8/2009 | Baldwin et al. |
| 2011/0173168 | A1 * | 7/2011 | Jones et al. .................... 707/695 |
| 2011/0307363 | A1 * | 12/2011 | N et al. ............................ 705/35 |

* cited by examiner

*Primary Examiner* — Fred I Ehichioya
*Assistant Examiner* — Dangelino Gortayo
(74) *Attorney, Agent, or Firm* — Nelson and Nelson; Daniel P. Nelson; Alexis V. Nelson (57) ABSTRACT

A method for processing a data object for a database, the database containing data representing a first data model and a set of one or more mapping rules, includes receiving a data object that conforms to a second data model. The method then selects one or more of the mapping rules. The mapping rules provide a mapping between a set of elements of the second data model and a corresponding set of elements of the first data model. The method applies the selected mapping rules to transform a set of elements of the received data object into a corresponding set of elements of a target data object conforming to the first data model. The method then searches the database for the set of elements of the target data object to identify instances of the target data object in the database. A corresponding computer program product and apparatus are also disclosed.

12 Claims, 5 Drawing Sheets

AVOIDING DUPLICATE AND EQUIVALENT DATA OBJECTS IN SERVICE REGISTRIES

BACKGROUND

Related Applications

This application claims priority to European Patent Application No. 10173741.9 filed on Aug. 23, 2010 and entitled A METHOD, APPARATUS OR COMPUTER PROGRAM PRODUCT FOR PROCESSING A DATA OBJECT FOR A DATABASE.

BACKGROUND OF THE INVENTION

Computer systems commonly include one or more databases for storing data in an organized manner for processing and/or reference. Database management applications may be provided to manage such databases. Such database management applications may enable elements of data, or data objects, to be added to, removed from, or read from a database. In some computer systems, duplicate or equivalent data objects may exist in a database. For example, two data objects that are identical or a data object that is an updated version of another data object may exist in a database.

In some database applications, such as those in distributed processing environments, it is important to avoid duplicate data in databases such as service registries. Service registries may serve different system functions such as governance, production, and test functions. Data objects may need to be transferred among such service registries without introducing duplicate data. It is fairly simple to determine whether a data object is identical to an existing data object in a service registry. However, it is substantially more difficult to determine if an existing data object is a different version (i.e., a substantially equivalent version) of another object in a service registry. In distributed processing environments, it is important to identify such equivalents to enable basic operations, such as data object promotion or registry synchronization. Therefore, there is a need in the art to more effectively identify substantially duplicate or equivalent data objects to avoid introducing such objects into service registries.

SUMMARY

The invention has been developed in response to the present state of the art and, in particular, in response to the problems and needs in the art that have not yet been fully solved by currently available apparatus and methods. Accordingly, the invention has been developed to provide apparatus and methods to avoid duplicate and equivalent data objects in databases such as service registries. The features and advantages of the invention will become more fully apparent from the following description and appended claims, or may be learned by practice of the invention as set forth hereinafter.

Consistent with the foregoing, a method for processing a data object for a database, where the database includes data representing a first data model and a set of one or more mapping rules, is disclosed herein. In one embodiment, such a method includes receiving a data object that conforms to a second data model. The method then selects one or more of the mapping rules. The mapping rules provide a mapping between a set of elements of the second data model and a corresponding set of elements of the first data model. The method then applies the selected mapping rules to transform a set of elements of the received data object into a corresponding set of elements of a target data object conforming to the first data model. The method then searches the database for the set of elements of the target data object to identify instances of the target data object in the database.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with an instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. The computer program instructions may also potentially be distributed across multiple computers or programmable data processing apparatus for execution thereon.

Figure 1:
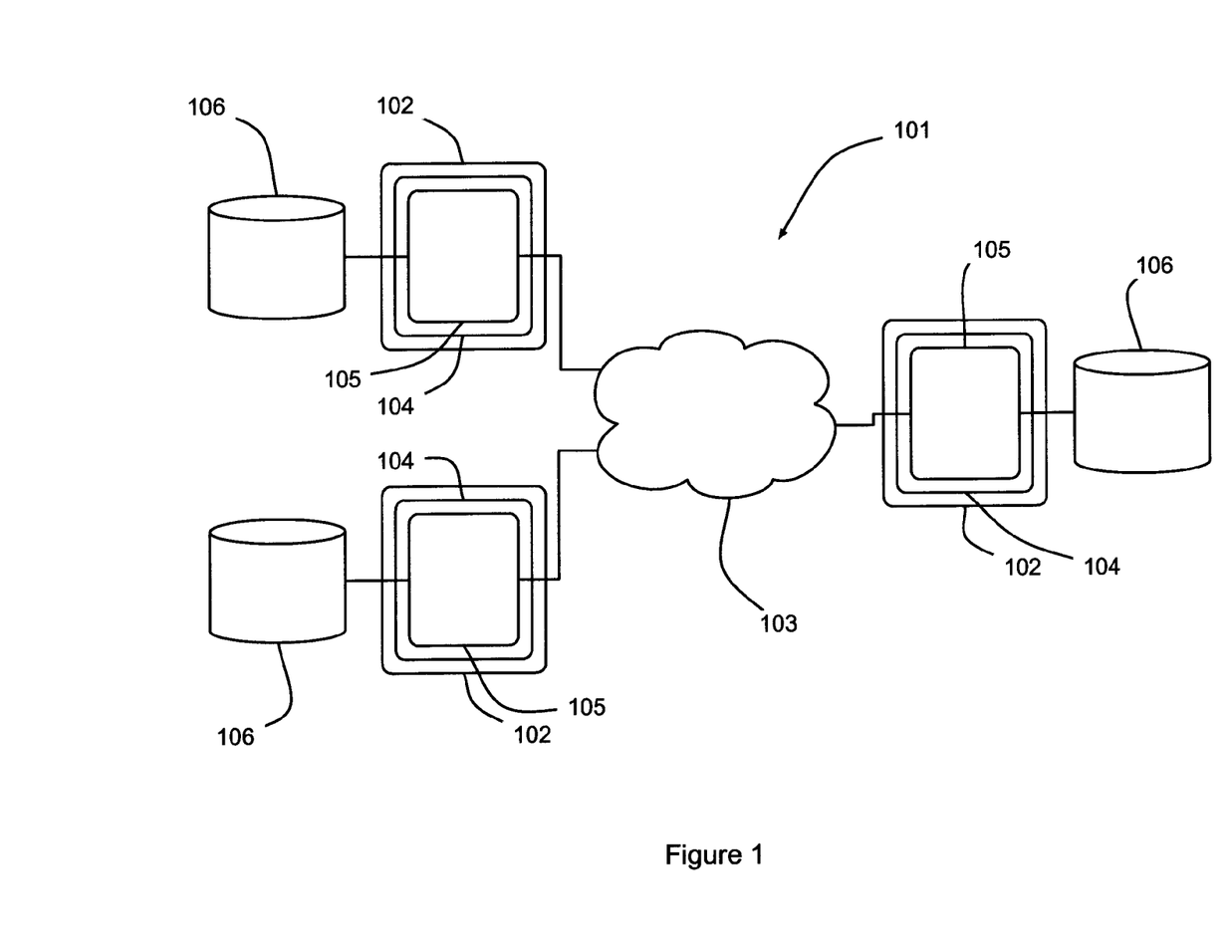
FIG. 1 is a schematic illustration of a computer system having multiple databases, in this example multiple service registries.

Referring to FIG. 1, one example of a computer system 101 is illustrated. In this example, the computer system 101 includes three computers 102 interconnected by a network 103, in this case a local area network (LAN) 103. Each of the computers 102 is provided with an operating system 104 that provides a processing platform for one or more application programs. In this embodiment, the computer system 101 has a service-oriented architecture (SOA). Each computer 102 is loaded with a service registry management application (SRMA) 105. The SRMAs 105 are configured to provide and manage respective databases in the form of service registries 106 within the distributed SOA environment. In the present embodiment, the SRMAs 105 are configured to manage the contents of their respective registries 106 so as to avoid the duplication of data elements (i.e., service registrations) therein.

In the present embodiment, the SOA environment is an object-oriented architecture in which each service registration in a given registry 106 is represented by a data object in the form of an entity object. Each such entity object is derived from and conforms to a data model in the form of an entity model. The entity model specifies the entity definition and attribute values for entity objects created in accordance with the given entity model. Each entity object inherits the properties of the entity model from which it is derived. Thus, in the present embodiment, each service registration represents an instance of or is derived from a corresponding service model. Each entity model is defined in a corresponding entity model descriptor. Different versions of an entity model may be active at respective registries 106 in the computer system 101.

Figure 2:
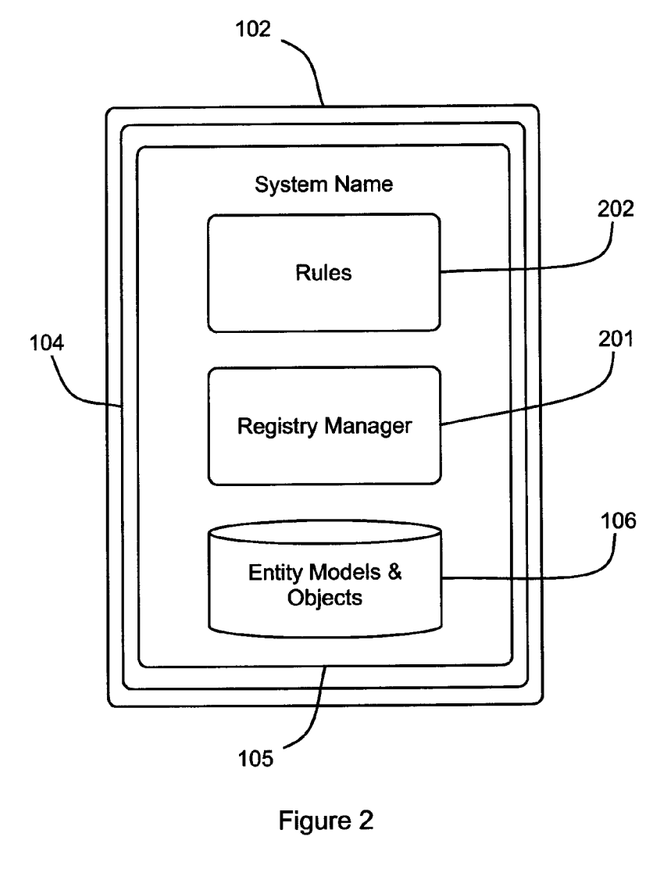
FIG. 2 is a schematic illustration of a service registry management application (SRMA) in the computer system of FIG. 1.

Referring to FIG. 2, each SRMA 105 comprises a registry manager module 201 and a set of rules 202, in the form of mapping rules 202. In the present embodiment, the registry manager module 201 uses the mapping rules 202 and knowledge of the active models in its respective registry 106 to avoid duplicating service registrations. In response to receiving a candidate service registration, the registry manager 201 identifies whether the candidate service registration conforms to one of its active models and, if so, determines the version of the model from which the candidate service registration was derived.

If the candidate service registration version and the corresponding active model version are compatible, the registry manager 201 searches the registry 106 to determine if the candidate service registration is already present. In certain cases, however, the candidate service registration version and the corresponding active model version may be different. In such cases, the registry manager 201 searches for service registrations of the active model version that are equivalent to the candidate service registration. If such a duplicate or equivalent duplicate service registration is identified in the registry 106, the registry manager 201 rejects the candidate service registration (i.e., does not store the candidate service registration in the registry 106).

In the present embodiment, the mapping rules 202 enable the registry manager 201 to transform selected elements of a candidate service registration of a non-active version of a model into the equivalent elements of the active version of the model. The mapping rules 202 thus provide a mapping between a first set of one or more elements of the non-active version of the model and a corresponding second set of one or more elements of the active version of the model. Applying the selected mapping rules 202 to the first set of elements of a candidate service registration thus converts the first set into the corresponding second set of elements conforming to the active model version. This second set of elements defines the target object for the duplicate search in the registry 106.

Figure 3:
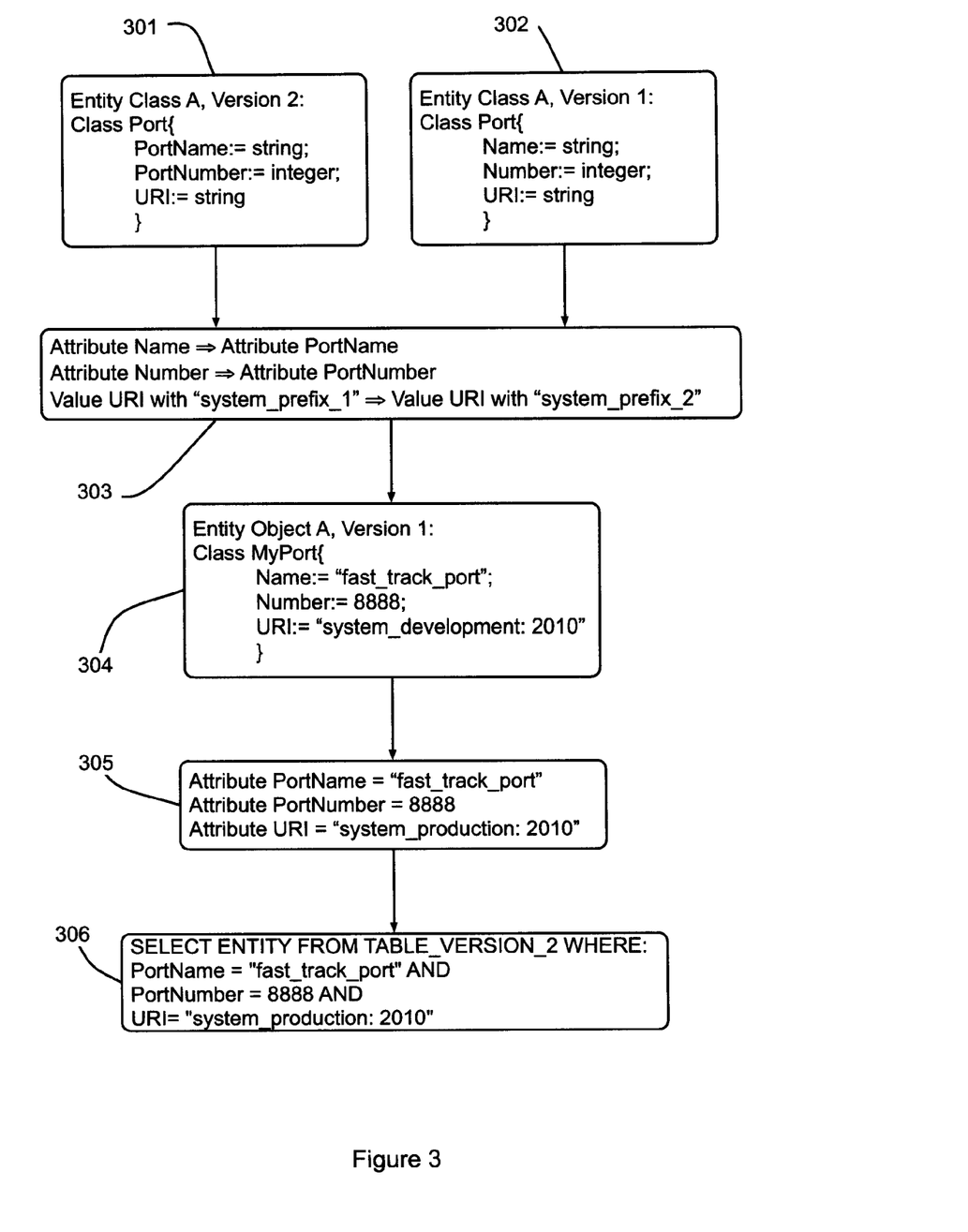
FIG. 3 shows one example of the SRMA of FIG. 2 processing a candidate data object for inclusion in a service registry.

One example of how the registry manager 201 applies the rules 202 is shown in FIG. 3. An active model 301 and a non-active model 302 are defined in respective descriptors as different versions of a service registration in the form of a class named "Class A". The active model 301 is "version 2" while the non-active model 302 is "version 1". Version 1 is an older version of version 2. Comparing the models 301, 302, a number of differences are identifiable. For example, the names of the first two attributes in each model 301, 302 are different. Furthermore, the "URI" attribute, which refers to a Uniform Resource Identifier, is highly likely to have different values in the entity object derived from the respective models 301, 302, as its value is dependent on the location, in terms of computer system, of the respective service registration.

In the present embodiment, the mapping rules 202 are derived from a set of rule templates for mapping elements between general models. The two general models may be defined as follows:

```
Entity Class A, Version X:
Class: Class Name {
Attribute Name 1:= Type 1;
Attribute Name 2:= Type 2;
Attribute Name 3:= Type 3
}
Entity Class A, Version Y:
Class: Class Name {
Attribute Name 4:= Type 1;
Attribute Name 5:= Type 2;
Attribute Name 6:= Type 3
}
```

In the present embodiment, the following three rule templates may be provided for mapping changes in attribute name, type, and value respectively:

Rule 1: Attribute Name: Class A (version Y) Attribute Name 1→Class A (Version X) Attribute Name 4

Rule 2: Attribute Type: Class A (version Y) Attribute Type 1→Class A (Version X) Attribute Type 2

Rule 3: Attribute Value: Class A (version Y) Attribute Value 3→Class A (Version X) Attribute Value 6

Some attribute values may be fixed for a given model—i.e., the model may set the attribute value. Other attribute values may be set in a given instance of the model (i.e., the attribute may be set in an entity object). However, in some cases it may be possible to determine from the definition of a given attribute in the respective model that an attribute value or part thereof will differ between given instantiations of the model. This may occur, for example, where the value of an attribute is dependent on specific local data. In the case of the URI shown in the models 301, 302 of FIG. 3, the URI prefix is determined by the name of the computer system in which the specific entity object is registered. In such cases, additional rule templates may be provided to map such domain specific attribute values between model versions.

In the example shown in FIG. 3, a set of three mapping rules 303 is generated for mapping between the two model versions 301, 302. The first two mapping rules 303 map the changed attribute names. The third mapping rule 303 maps an attribute value in the form of a URI. The third mapping rule 303 ensures that the value of the URI attribute with the prefix "system_1" is mapped to the value of the URI with the prefix "system_2". In other words, the initial prefix in the value (system_1) is changed to the target prefix (system_2). In the third mapping rule 303, the values of "system_1" and "system_2" are variables that are replaced by the respective real values to complete the rule.

When a candidate entity object 304 in the form of a service registration for inclusion in the registry 106 arrives, the registry manager 201 applies the mapping rules 303 to the candidate entity object 304. This transforms the first set of elements of the candidate entity object 304 into a corresponding second set of elements 305 for a target data object conforming to the active model version 301. In other words, the mapping rules 303 convert or translate the elements that are different between the two versions 301, 302 of the model resulting in a set of elements 305 that are version-2 equivalents of the elements in the candidate entity object 304. The set of elements is then recast as a query statement 306 for searching the registry 106 to identify whether an instance of target entity object having the set of elements is already contained therein.

Figure 4:
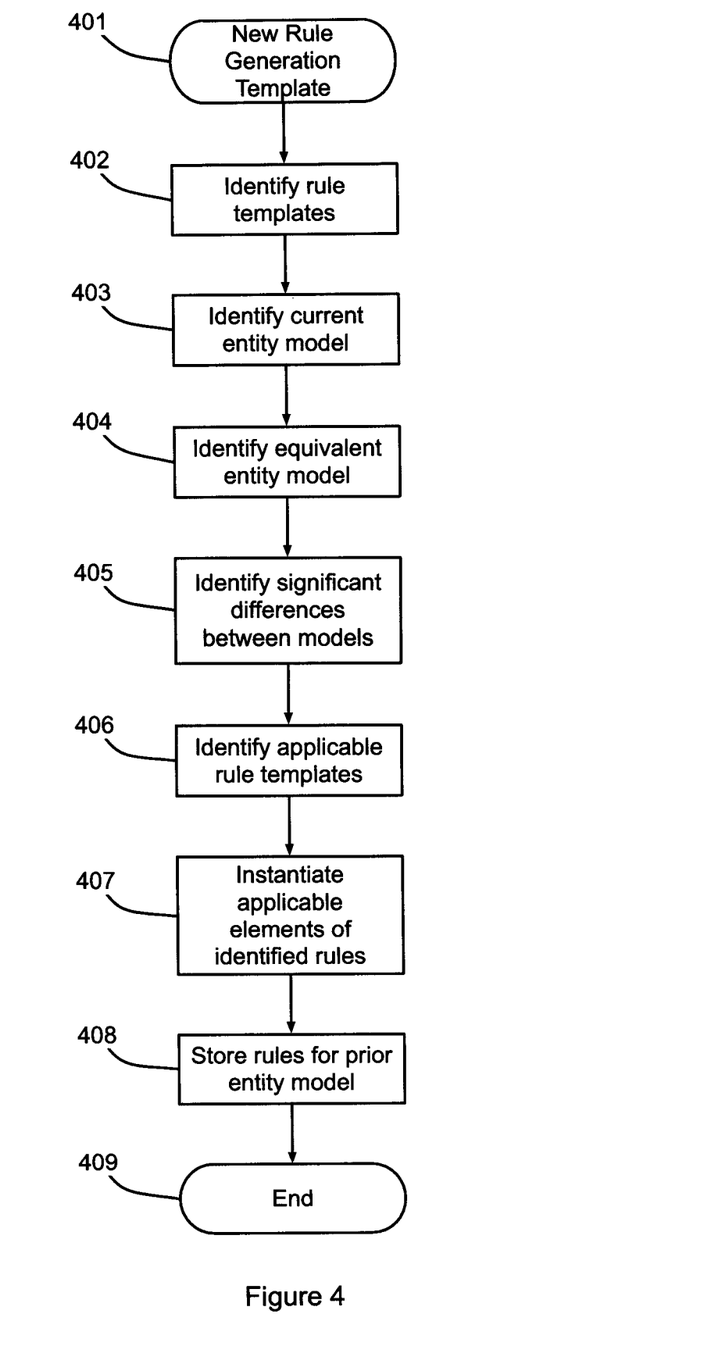
FIG. 4 is a flow chart showing an example of processing that is performed when producing one or more rules for the SRMA.

Referring to FIG. 4, an example of the processing that is performed when creating new rules from rule templates is described. As shown, processing is initiated at step 401 and proceeds to step 402, where each rule template for the given system is identified 402. The current or active entity model for the given registry is then identified 403. The other entity model, such as a prior version of the active entity model, is then identified 404. The significant differences between the active and other entity model are then identified 405. The rule templates that are applicable to the identified changes are then identified 406. The identified rule templates are then instantiated 407 with the appropriate values from the active and other entity model. The rules are then stored 408 for subsequent use. Processing then ends at step 409.

Figure 5:
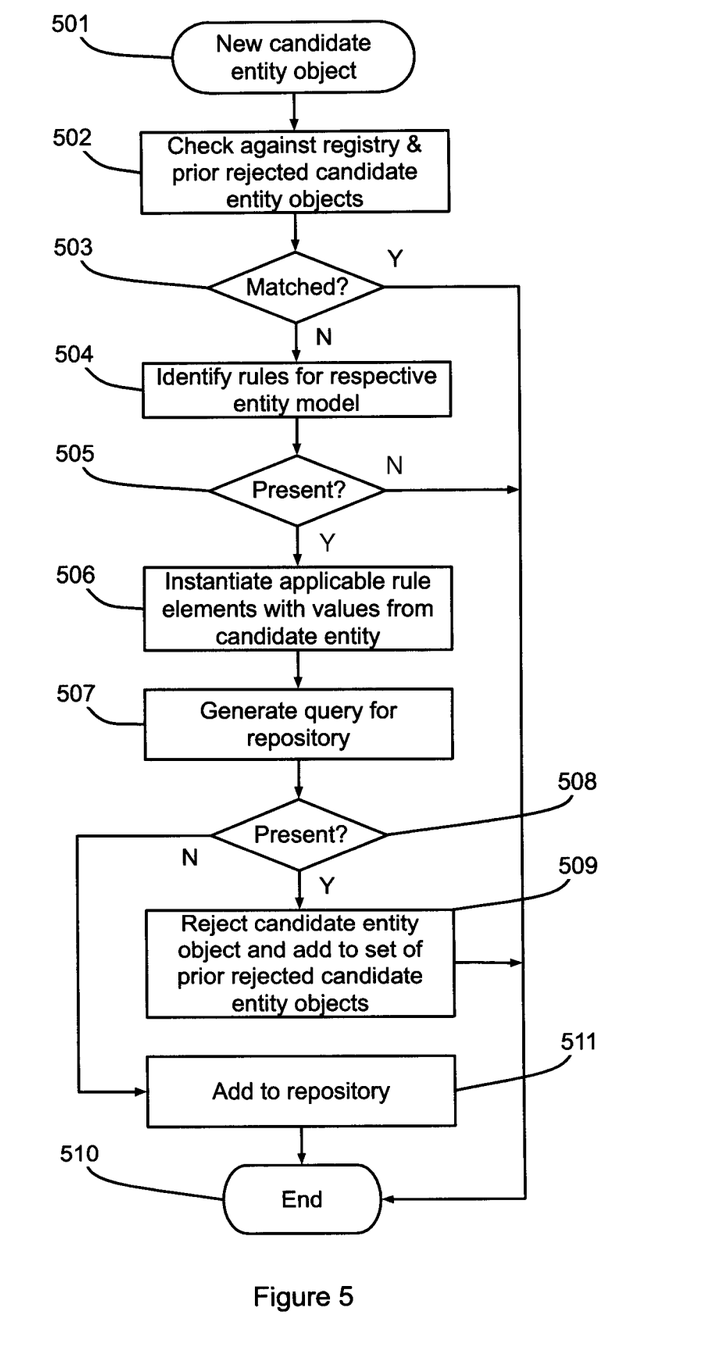
FIG. 5 is a flow chart showing an example of processing that is performed by the SRMA when processing a candidate object.

Referring to FIG. 5, an example of processing that is performed by the registry manager 201 in response to receiving a candidate entity object in the form of a service registration for inclusion in the registry 106 is described. Processing is initiated at step 501 in response to receiving a candidate entity object. Processing then proceeds to step 502, where the candidate entity object is checked 502 against the registry 106. The candidate entity object is also checked 502 against data identifying previously rejected candidate entity objects. Processing may then proceed to step 503 to determine if the candidate object matches any entity object present in the registry 106 or any previously rejected candidate entity object.

If no match is found, the rules are searched 504 for those applicable to the model and version of the candidate entity object. It is then determined 505 whether one or more mapping rules were identified for the candidate entity object at step 504. If one or more rules were identified, the identified rules are instantiated 506 with the appropriate values from the candidate entity object and any domain specific data. A query is then generated 507 from the instantiated rules to search the registry 106 for a target entity object that is equivalent to the candidate entity object. If, at step 508, an equivalent entity object is identified in the repository, the candidate entity object is rejected 509 for inclusion in the registry 106. Data identifying the rejected candidate entity object is then added 509 to the registry 106 for checking against subsequently received candidate entity objects, as described in step 502. Processing then ends 510.

If, at step 503, the candidate object matches an entity object in the registry 106 or any previously rejected candidate entity object, then processing ends 510. Similarly, if, at step 505, no rules are identified for mapping the candidate entity object to an equivalent entity object, processing ends 510. If, at step 508, no equivalent candidate entity object is identified in the repository 106, the candidate entity object is added 511 to the repository 106 to generate a new service registration. Processing then ends 510.

In another embodiment, if a candidate data object matches a target data object in the database, the target data object is replaced by the candidate data object in the database. In other words, the candidate data object may be substituted for any matching target data object in the database. For example, given a set of registries that includes a master registry and one or more subordinate registries, changes to the master registry may supercede changes to the subordinate registries. In such cases, the master registry may have a policy to reject duplicate candidate data objects, whereas the subordinate registries may have a policy to reject duplicates except those from the master registry. As will be understood by those in the art, communication between registries may include identifying the source of a message. Thus, in certain embodiments, subordinate registries may be configured to detect a duplicate of a candidate data object from the master registry and replace the duplicate data object with the candidate data object. This mechanism enables synchronization of subordinate registries with a master registry.

In another embodiment, a candidate data object may be a candidate for partial substitution or merging with any matching target data object. In other words, the target data object may not be replaced entirely. Rather, one or more elements of the target data object may be updated with those of the candidate data object or missing elements may be added to the target data object.

Embodiments of the invention may enable a database management application, such as an SRMA, to identify existing data objects, such as service registrations, that are duplicates of a received candidate data object. The database management application may include an explicit or implicit policy to determine the course of action to take in such circumstances. Such a policy may determine whether a candidate data object that is duplicated in the registry is rejected or completely or partially substituted for the existing duplicate. In some cases, the policy may set forth different courses of action to take depending on the source of a given candidate data object such as in the master/subordinate registry example described above.

As will be understood by those in the art, embodiments of the invention may be used in any suitable database application where avoiding duplicate or equivalent entries in a database is required or desired, and where mapping rules between equivalent data objects may be determined.

In some embodiments, the processing steps and data relating to previously rejected candidate entity objects, as described in FIG. 5, may be omitted. In other embodiments, the mapping rules may be generated automatically, manually, or a combination thereof. For example, an automatic rule generator may generate a draft set of rules for further manual modification, if required.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. An apparatus for processing a service registration data object for a service registry database, the apparatus configured to:
provide a service registry manager configured to manage a database storing data objects representing a first data model and a set of one or more mapping rules, wherein the database is a service registry and each data object in the database is associated with a service registration;
receive, by the service registry manager, a data object conforming to a second data model;
search, by the service registry manager, the database for a set of elements of the received data object to identify instances of the received data object in the database;
select, by the service registry manager, at least one of the mapping rules, the mapping rules providing a mapping between a set of elements of the second data model and a corresponding set of elements of the first data model;
apply, by the service registry manager, the selected mapping rules to transform the set of elements of the received data object into a corresponding set of elements of a target data object conforming to the first data model; and
search, by the service registry manager, the database for the set of elements of the target data object to identify instances of the target data object in the database.

2. The apparatus of claim 1, wherein the received data object is a candidate data object for inclusion in the database.

3. The apparatus of claim 2, wherein the service registry manager is further configured to reject the candidate data object for inclusion in the database if the target data object is identified in the database.

4. The apparatus of claim 3, wherein the service registry manager is further configured to:
store data identifying the rejected candidate data object;
check a further candidate data object against the data identifying the rejected candidate data object; and
reject the further candidate data object for inclusion in the database if the rejected candidate data object and the further candidate data object correspond.

5. The apparatus of claim 1, wherein the data object comprises data identifying the second data model.

6. The apparatus of claim 1, wherein applying the selected mapping rules comprises instantiating at least one element of the target data object with data from at least one element of the received data object.

7. The apparatus of claim 6, wherein applying the selected mapping rules comprises instantiating at least one element of the target data object with data external from the received data object.

8. The apparatus of claim 1, wherein the service registry manager is further configured to incorporate the set of elements of the target data object into a query statement to search the database for an instance of the target data object.

9. The apparatus of claim 1, wherein the set of elements of the first data model comprises at least one of an object class definition and an attribute definition.

10. The apparatus of claim 1, wherein the service registry manager is further configured to substitute the received data object for an instance of the target data object if the instance of the target data object is identified in the database.

11. The apparatus of claim 10, wherein substituting the received data object comprises merging selected elements of the received data object with the instance of the target data object.

12. A computer program product to process a service registration data object for a service registry database, the computer program product comprising a non-transitory computer-readable storage medium having computer-usable program code embodied therein, the computer-usable program code configured to:
implement a service registry manager configured to manage a database storing data objects representing a first data model and a set of one or more mapping rules, wherein the database is a service registry and each data object in the database is associated with a service registration;

receive, by the service registry manager, a data object conforming to a second data model;

search, by the service registry manager, the database for a set of elements of the received data object to identify instances of the received data object in the database;

select, by the service registry manager, at least one of the mapping rules, the mapping rules providing a mapping between a set of elements of the second data model and a corresponding set of elements of the first data model;

apply, by the service registry manager, the selected mapping rules to transform a set of elements of the received data object into a corresponding set of elements of a target data object conforming to the first data model; and search, by the service registry manager, the database for the set of elements of the target data object to identify instances of the target data object in the database.

* * * * *